US006323887B1

(12) United States Patent
Shiraishi et al.

(10) Patent No.: US 6,323,887 B1
(45) Date of Patent: Nov. 27, 2001

(54) COLOR IMAGE FORMING APPARATUS DRIVING A RECORDING-ELEMENT ARRAY AND A METHOD FOR CONTROLLING THE SAME

(75) Inventors: Mitsuo Shiraishi, Shizuoka-ken; Toshiyuki Sekiya, Mishima, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/479,654

(22) Filed: Jan. 10, 2000

(30) Foreign Application Priority Data

Jan. 18, 1999 (JP) .................................... 11-009545

(51) Int. Cl.[7] ............................ B41J 2/385; G01D 15/06; G03G 15/01
(52) U.S. Cl. ......................... 347/115; 347/132; 347/237
(58) Field of Search .................... 347/130, 132, 347/225, 237, 115, 238

(56) References Cited

U.S. PATENT DOCUMENTS

| 5,815,025 | * | 9/1998 | Kubota ............................ 347/132 X |
| 5,926,201 | * | 7/1999 | Fleming et al. .................. 347/237 |
| 5,969,744 | * | 10/1999 | Sakashita et al. .............. 347/237 |
| 6,008,833 | * | 12/1999 | Ohtsubo et al. ................ 347/237 |
| 6,025,858 | * | 2/2000 | Tanioka et al. ................. 347/238 X |
| 6,069,644 | * | 5/2000 | Tanioka et al. ................. 347/238 |
| 6,108,018 | * | 8/2000 | Narita et al. ................... 347/132 |

FOREIGN PATENT DOCUMENTS

| 1-238962 | 9/1989 | (JP) . |
| 2-208607 | 8/1990 | (JP) . |
| 2-212170 | 8/1990 | (JP) . |
| 3-20457 | 1/1991 | (JP) . |
| 3-194978 | 8/1991 | (JP) . |
| 4-23367 | 1/1992 | (JP) . |
| 4-5872 | 1/1992 | (JP) . |
| 4-296579 | 10/1992 | (JP) . |
| 5-84971 | 4/1993 | (JP) . |
| 9-311664 | * | 12/1997 | (JP) . |
| 10-297017 | * | 11/1998 | (JP) . |

\* cited by examiner

Primary Examiner—Susan S. Y. Lee
(74) Attorney, Agent, or Firm—Fitzpatrick, Cella, Harper & Scinto

(57) ABSTRACT

A sharp image having excellent color balance is formed by preventing differences in the amount of light among recording heads. When forming an image using at least two recording heads, each having transfer thyristors and light-emitting thyristors arranged in the form of an array, by causing the transfer thyristors of M, C and Y recording heads having light-emitting thyristors not to be lit to perform transfer operations as the transfer thyristors of a K recording head having light-emitting thrystors to be lit, the difference in the amount of light among the recording heads is corrected.

9 Claims, 9 Drawing Sheets

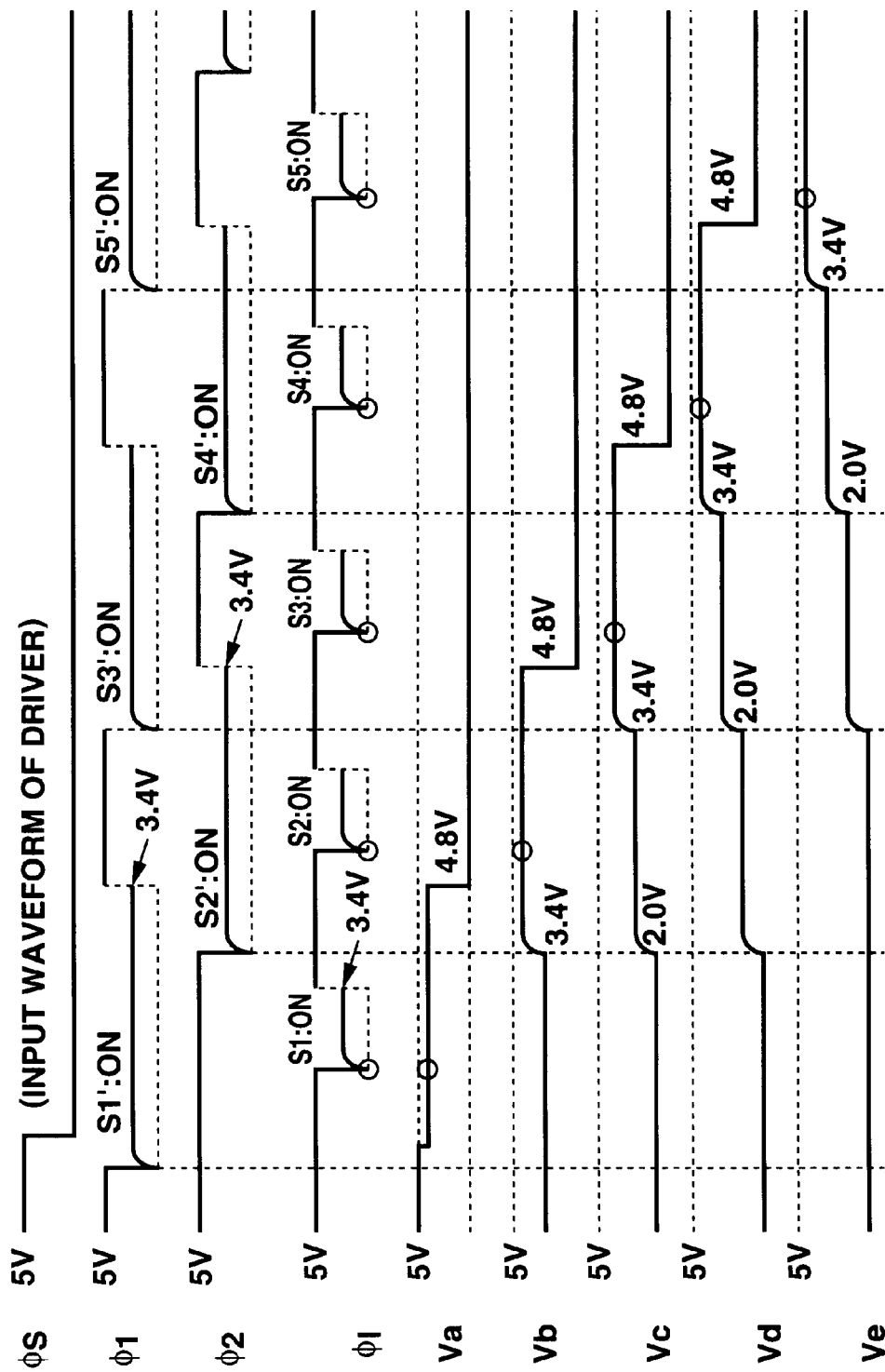

COLOR IMAGE FORMING APPARATUS DRIVING A RECORDING-ELEMENT ARRAY AND A METHOD FOR CONTROLLING THE SAME

BACKGROUND OF THE INVENTION

1. Field of the Invention

The present invention relates to an apparatus and method for controlling driving of a light-source device, and more particularly, to an apparatus and method for controlling driving of a recording head used for forming a permanent visual image on a recording medium according to an electrophotographic method.

2. Description of the Related Art

Conventionally, when forming a permanent visual image on a recording medium according to an electrophotographic method, it is necessary to form a latent image by projecting light emitted from a light-source device onto a photosensitive member.

For that purpose, recording heads, each including, for example, an LED (light-emitting diode) array, particularly, a self-scanning LED array (hereinafter termed a "SLED"), have been known.

A SLED head, serving as a recording head having SLED chips arranged in the form of an array, outputs an amount of light necessary for exposing a photosensitive member of an image forming apparatus by emission of light-emitting thyristors. Conventionally, when using four SLED heads arranged in parallel as an exposure light source of a four-drum-tandem-type color printer, and, for example, forming an image only by one (for example, the K station) of Y (yellow), M (magenta), C (cyan), and K (black) stations (image forming units) depending on image data, only a SLED head necessary for exposure of the photosensitive member is driven and lit while stopping the operations of the SLED heads of other stations.

However, when only the SLED head of one station is driven in order to emit light from the light-emitting thyristors of that head, the temperature of the SLED head gradually increases, causing a decrease in the amount of light. That is, a difference in the amount of light is produced between a SLED head which is continuously lit and a SLED head for which driving has just started, due to a difference in the temperature.

If a full-color image is output (i.e., by emitting light from all of the SLED heads of the four stations) after the above-described case of using only the K station, a deviation occurs in color balance and a sharp image cannot be formed, because the amount of exposure by heads which have not been driven is larger than that of the head which has been driven.

SUMMARY OF THE INVENTION

It is an object of the present invention to provide an image forming apparatus and a method for controlling the apparatus in which differences in the amount of light among recording heads can be prevented.

It is another object of the present invention to provide an image forming apparatus and a method for controlling the apparatus in which a sharp image having excellent color balance can be formed.

According to one aspect of the present invention, an image forming apparatus includes a plurality of image forming units corresponding to different colors. Each of the plurality of image forming units includes a recording element array in which recording elements are arranged in the form of an array, a transfer-element array for transferring respective operations of the recording elements, and scanning means for causing the recording-element array to perform scanning by controlling transfer elements constituting the transfer-element array. The apparatus also includes means for also operating the scanning means of image forming units which do not directly contribute to image formation from among the plurality of image forming units, when forming an image by selectively using the plurality of image forming units.

According to another aspect of the present invention, a method for controlling an image forming apparatus including a plurality of image forming units corresponding to different colors is provided. Each of the plurality of image forming units includes a recording-element array in which recording elements are arranged in the form of an array, and a transfer-element array for transferring respective operations of the recording elements. When forming an image by selectively using the plurality of image forming units, the recording-element arrays of image forming units which do not directly contribute to image formation from among the plurality of image forming units are also caused to perform scanning by controlling transfer elements of the concerned image forming units.

The foregoing and other objects, advantages and features of the present invention will become more apparent from the following detailed description of the preferred embodiment taken in conjunction with the accompanying drawings.

BRIEF DESCRIPTION OF THE DRAWINGS

FIG. 9 is a timing chart illustrating respective conventional control signals for controlling an SLED.

DETAILED DESCRIPTION OF THE PREFERRED EMBODIMENT

A preferred embodiment of the present invention will now be described in detail with reference to the drawings.

Outline

First, an outline of the present invention will be described.

According to the present invention, in an image forming apparatus for forming a permanent visual image on a recording medium according to an electrophotographic method using recording heads, driving of the recording heads are controlled so that differences in the amount of light among the recording heads caused by differences in the temperature rise among the recording heads can be reduced.

The image forming apparatus forms an image using at least two SLED heads, serving as recording heads, obtained by linearly arranging SLED-array chips in the form of an array. Each of the SLED-array chips includes thyristors, at least one of which is arranged in the form of an array, capable of applying a control signal for transfer between adjacent elements from the outside, and light-emitting thyristors, at least one of which is arranged in the form of an array in parallel to the transfer thyristors, and the gates of each set of the transfer thyristors and the light-emitting thyristor are connected to each other. In SLED heads in which light-emitting thyristors are not to be lit, driving control is performed so that the transfer operations of transfer thyristors connected to the light-emitting thyristors not to be lit are also performed based on image data.

Thus, the temperature of the unlit SLED heads becomes close to the temperature of the lit SLED head. As a result, the temperature differences among the heads do not occur, so that the differences in the amount of light among the heads do not occur.

Embodiment

A description will now be provided illustrating the preferred embodiment.

Figure 3:
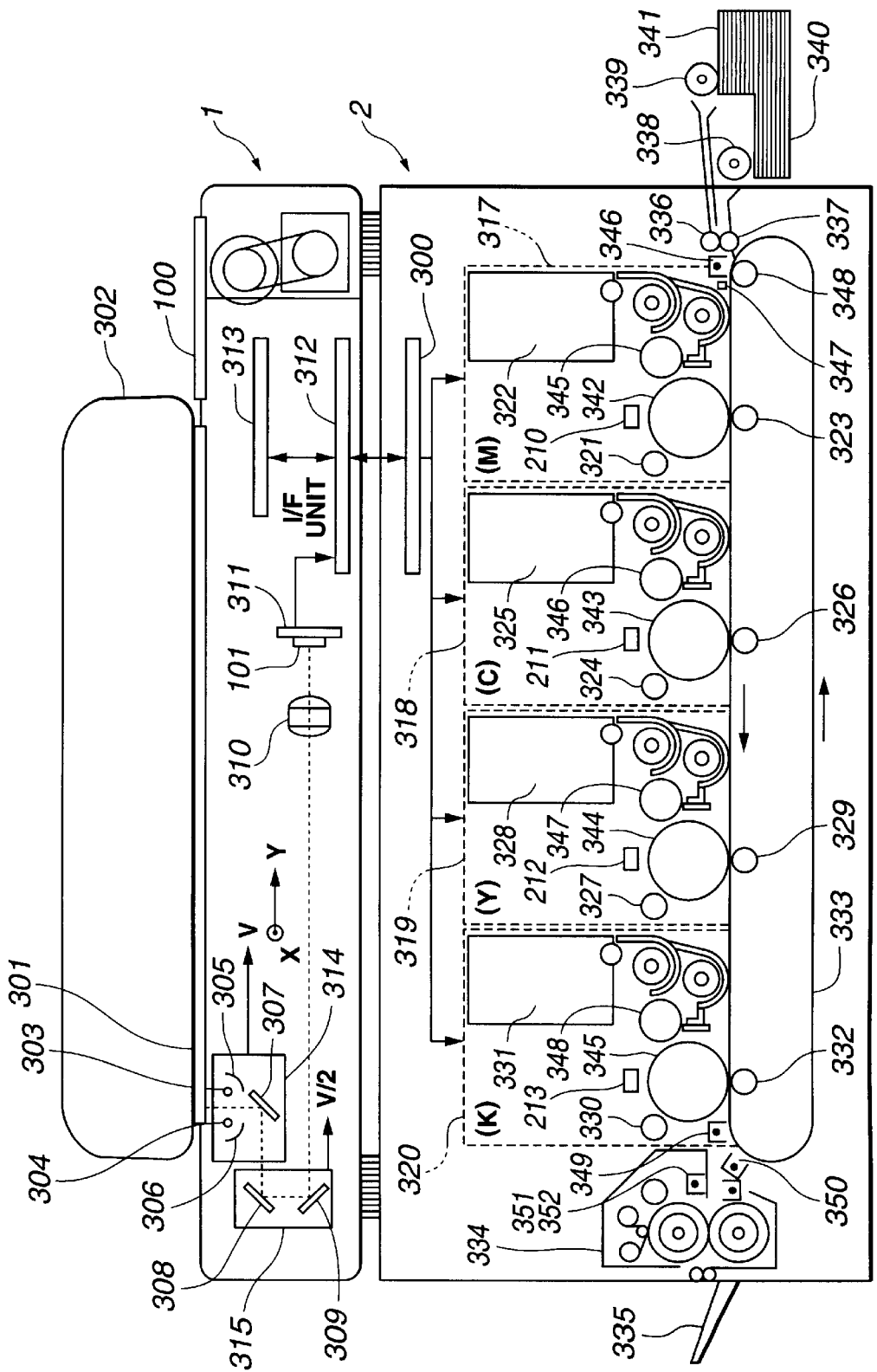
FIG. 3 is a schematic cross-sectional view illustrating the entire configuration of the color image forming apparatus.

FIG. 3 schematically illustrates the entire configuration of a color image forming apparatus according to the preferred embodiment. However, the present invention may be applied not only to a color image forming apparatus, but also to any apparatus which can control driving of a plurality of recording heads.

This apparatus includes a color reader unit 1 and a printer unit 2.

Reader unit

The configuration of the color reader unit 1 will now be described.

In FIG. 3, there are shown a display/operation input unit 100, a CCD (charge-coupled device) 101, a substrate 311 on which the CCD 101 is mounted, and a printer processing unit 312.

There are also shown an original-mount glass plate (platen) 301, and an original-feeding device 302. A specular or white pressing plate (not shown) may also be mounted instead of the original-feeding device 302. Light sources 303 and 304 illuminate an original, and comprise tungsten halogen lamps or fluorescent lamps. Reflectors 305 and 306 condense light from the light sources 303 and 304 onto the original, respectively. There are also shown mirrors 307–309. A lens 310 condenses reflected or projected light from the original onto the CCD 101. A carriage 314 accommodates the light sources 303 and 304, the reflectors 305 and 306, and the mirror 307. A carriage 315 accommodates the mirrors 308 and 309. There is also shown an interface (I/F) unit 313, serving as an interface with other devices, such as an IPU (instruction processing unit.) and the like.

The carriages 314 and 315 mechanically move in a direction Y orthogonal to an electrical scanning direction (main scanning direction) of the CCD 101 (a sub-scanning direction) at speeds V and V/2, respectively, in order to scan the entire surface of the original (sub-scanning).

Printer unit

The configuration of the printer unit 2 will now be described.

In FIG. 3, there are shown a magenta(M)-image forming unit 317, a cyan(C)-image forming unit 318, a yellow(Y)-image forming unit 319, and a black(K)-image forming unit 320. Since these units have the same configuration, only the M-image forming unit 317 will be described in detail, and a description about the other image forming units 318–320 will be omitted.

Figure 8:
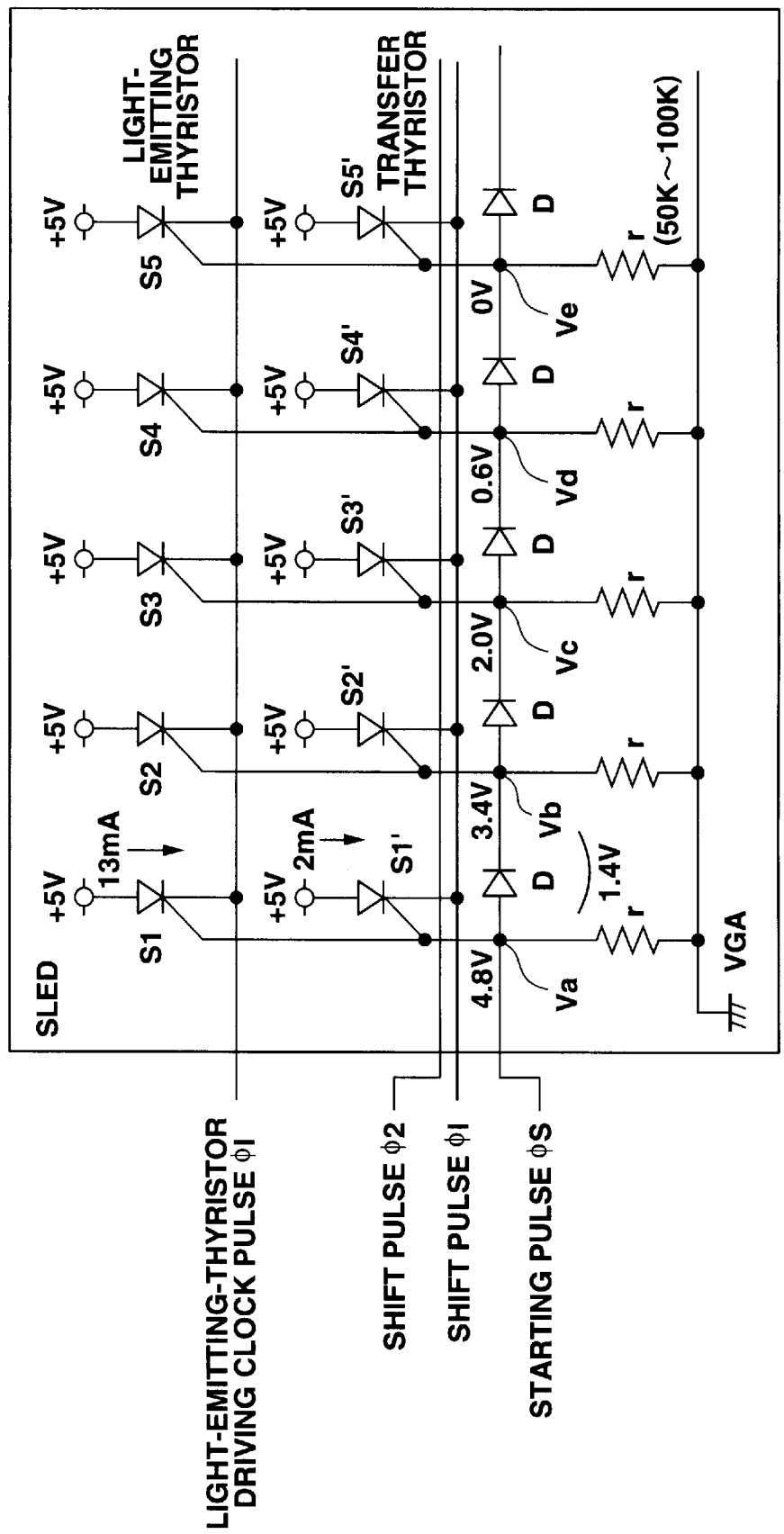
FIG. 8 is a circuit diagram illustrating the basic configuration of a SLED.

The M-image forming unit 317 includes an LED array 210, serving as a recording head. A SLED head obtained by linearly arranging SLED-array chips in the form of an array is used as the LED array 210. As shown in FIG. 8, each of the SLED-array chips includes thyristors, at least one of which is arranged in the form of an array, capable of applying a control signal for transfer between adjacent elements from the outside, and light-emitting thyristors, at least one of which is arranged in the form of an array in parallel to the transfer thyristors, and the gates of each set of the transfer thyristor and the light-emitting thyristor are connected to each other. Other LED arrays 211, 212 and 213 have the same configuration as the LED array 210. Hence, further description thereof will be omitted.

A latent image is formed on the surface of a photosensitive drum 342 by light from the LED array 210. A primary charger 321 charges the surface of the photosensitive drum 342 to a predetermined potential in order to prepare for forming the latent image. A developing unit 322 develops the latent image on the photosensitive drum 342 to form a toner image. The developing unit 322 includes a sleeve 345 for performing development by applying a developing bias voltage.

A transfer charger 323 performs discharge from the back of a transfer-material conveying belt 333 in order to transfer the toner image on the photosensitive drum 342 onto a recording sheet or the like on the transfer-material conveying belt 333. Although a cleaning unit is not provided in this embodiment because the transfer efficiency is excellent, a cleaning unit may be mounted.

Image forming processing

Next, an outline of image forming processing of this apparatus will be described. A description will be provided mainly on a procedure for transferring the toner image onto a transfer material, such as recording paper or the like.

Sheets of a transfer material, such as recording paper or the like, accommodated in a cassette 340 or 341 are individually fed by a pickup roller 338 or 339, respectively, and each sheet is supplied onto the transfer-material conveying belt 333 by sheet feeding rollers 336 and 337. The supplied sheet is charged by an attraction charger 346. A transfer-material-conveying-belt roller 348 drives the transfer-material conveying roller 333, and charges the sheet in cooperation with the attraction charger 346 in order to attract the sheet onto the transfer-material conveying roller 333.

The transfer-material-conveying-belt roller 348 may also be used as a roller for driving the transfer-material conveying belt 333. Alternatively, a roller for driving the transfer-material conveying belt 333 may be disposed at an opposite side.

A sheet-leading-edge sensor 347 detects the leading edge of the sheet on the transfer-material conveying belt 333. A detection signal from the sheet-leading-edge sensor 347 is transmitted from the printer unit 2 to the color reader unit 1, and is used as a sub-scanning synchronizing signal when transmitting a video signal from the color reader unit 1 to the printer unit 2. Thereafter, the sheet is conveyed by the transfer-material conveying belt 333, and toner images are formed on the surface of the sheet in the order of M, C, Y and K in the image forming unit 317–320.

The sheet passing through the K-image forming unit 320 is separated from the transfer-material conveying belt 333 after removing charges on the sheet by a charge removing charger 349 in order to facilitate separation from the transfer-material conveying belt 333.

A separation charger 350 prevents disturbance in the image due to separation discharge produced when the sheet is separated from the transfer-material conveying belt 333. The separated sheet is charged by prefixing chargers 351 and 352 in order to prevent disturbance in the image by supplementing the toner attracting force. Then, the toner image is subjected to thermal fixing by a fixing unit 334, and the sheet having the fixed toner image thereon is discharged onto a discharged-sheet tray 335.

Exposure control

Next, a description will be provided of exposure control in the embodiment.

First, the internal configuration and the operational principle of SLED chips will be described in detail.

The SLED is introduced, for example, in Japanese Patent Laid-Open Application (Kokai) Nos. 1-238962 (1989), 2-208067 (1990), 2-212170 (1990), 3-20457 (1991), 3-194978 (1991), 45872 (1992), 4-23367 (1992), 4-296579 (1992) and 5-84971 (1993), a proposal of a light-emitting array for an optical printer having integrated driving circuits, Japan Hard Copy '91 (A-17), and a proposal of a self-scanning light-emitting elements (SLED) using a PNPN thyristor structure, the Institute of Electronics, Information and Communication Engineers (March 5, '90), and is attracting notice as light emitting elements for recording.

FIG. 8 illustrates an example of the configuration of the SLED. FIG. 9 illustrates control signals and timings for controlling the SLED shown in FIG. 8 when lighting all elements.

In FIG. 8, VGA is a power-supply voltage for the SLED, and is connected to diodes D via corresponding resistors r. The diodes D are subjected to cascade connection. A starting pulse ΦS is applied to the diode at the uppermost stage. The SLED includes transfer thyristors S1'–S5' and light-emitting thyristors S1–S5, each arranged in the form of an array. The gates of corresponding thyristors at each stage are connected to each other. The ΦS signal is input to a terminal connected to the gates of the thyristors at the first stage. The gates of the thyristors at the second stage are connected to the cathode of the diode D connected to the terminal where the ΦS signal is input, the gates of the thyristors at the third stage are connected to the cathode of the diode D at the next stage, and so on.

A description will now be provided of the transfer and light-emitting operations of the SLED.

In FIG. 9, the transfer starts by changing the ΦS from 0 V to 5 V. As a result, Va=4.8 V, Vb=3.4 V (assuming the forward-direction voltage drop of the diode to be 1.4 V), Vc=2.0 V, Vd=0.6 V, and values after Ve become 0 V. The gate voltages of the transfer thyristors S1' and S2' change from 0 V to 4.8 V and 3.4 V, respectively.

By making Φ1 from 5 V to 0 V in this state, the potentials of the transfer thyristor S1' become 5 V, 0 V and 4.8 V at the anode, the cathode and the gate, respectively, to provide an on-condition for the thyristor, so that the transfer thyristor S1' is turned on. Even if the ΦS is changed to 0 V in this state, Va assumes 4.8 V because the thyristor S1' is in an on-state (the pulse ΦS is applied via the resistor, and the potential becomes substantially the same at the anode and the cathode when the thyristor is turned on). Accordingly, the on-condition of the first-stage thyristor is maintained even of the ΦS is set to 0 V, and the shift operation of the first stage is completed.

If the Φ1 of the light-emitting thyristor S1 is changed from 5 V to 0 V, the light-emitting thyristor S1 is turned on because the same condition when the transfer thyristsor S1' is turned on is provided, so that the first stage LED is lit. By returning the Φ1 to 5 V, the potential difference between the anode and the cathode of the light-emitting thyristor S1 disappears, and the minimum holding current for the thyristor cannot be flown. Hence, the light-emitting thrystor S1 is turned off.

Next, a description will be provided of the transfer condition of the transfer thyristor.

Even if the light-emitting thyristor S1 is turned off, the transfer thyristor S1' remains in the on-state, because the Φ1 remains 0 V. As a result, Va=4.8 V, and Vb=3.4 V in the transfer thyristor S1'.

By changing Φ2 from 5 V to 0 V in this state, the potentials of the transfer thyristor S2' assume 5 V, 0 V and 3.4 V at the anode, the cathode and the gate, respectively, so that the transfer thyristor S2' is turned on.

By changing the Φ1 from 0 V to 5 V after turning on of the transfer thyristor S2', the transfer thyristor S1' is turned off in the same manner as the light-emitting thyristor S1 is turned off. Thus, the on-state of the transfer thyristor shifts from S1' to S2'. By changing the Φ1 from 5 V to 0 V, the light-emitting thyristor S2 is turned on to emit light.

Only the light-emitting thyristor corresponding to the transfer thyristor which is turned on can emit light for the following reason. That is, when the transfer thyristor is not in an on-state, the on-condition of the thyristor is not provided because the gate voltage is 0 V except for the thyristor adjacent to the thyristor in the on-state. By turning on of the light-emitting thyristor, the potential of the Φ1 becomes 3.4 V (corresponding to the amount of the forward-direction voltage drop of the light-emitting thyristor) for the adjacent thyristor. Since the potential difference between the gate and the anode of the adjacent thyristor disappears, the adjacent thyristor cannot be turned on.

Figure 1:
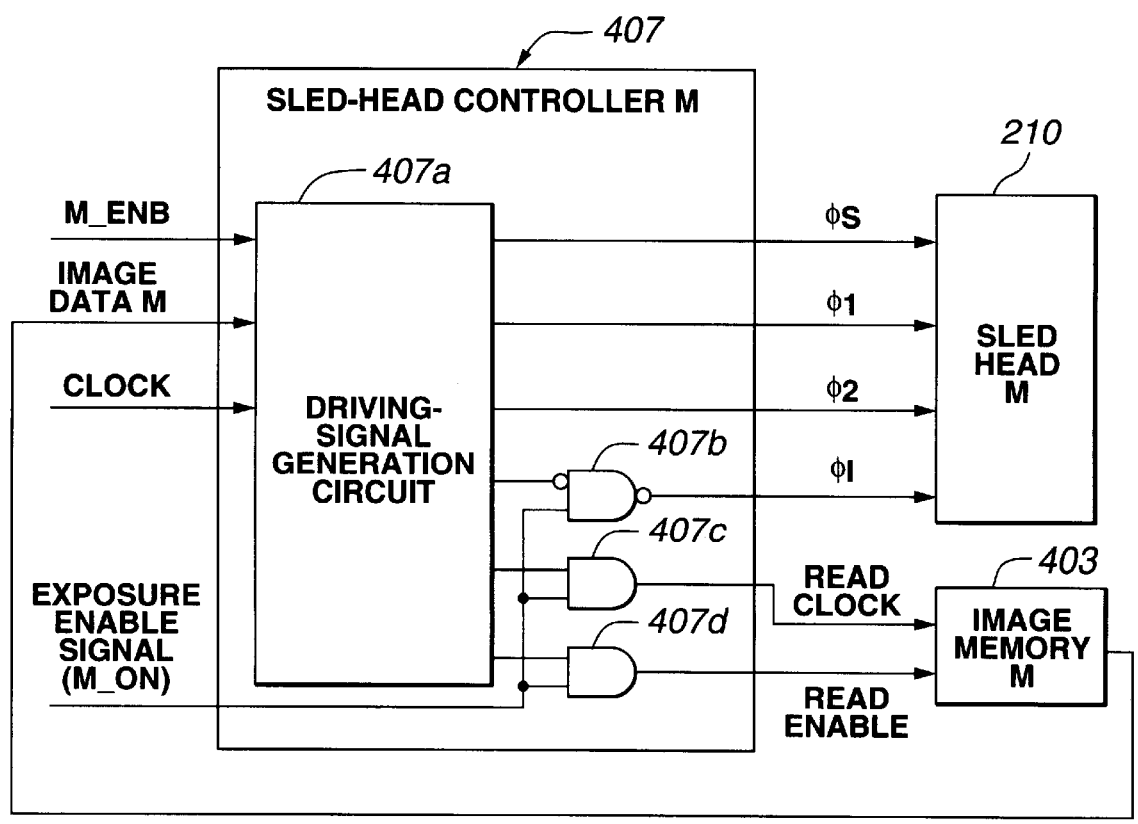
FIG. 1 is a block digram illustrating the configuration of a SLED-head controller according to an embodiment of the present invention.
Figure 2:
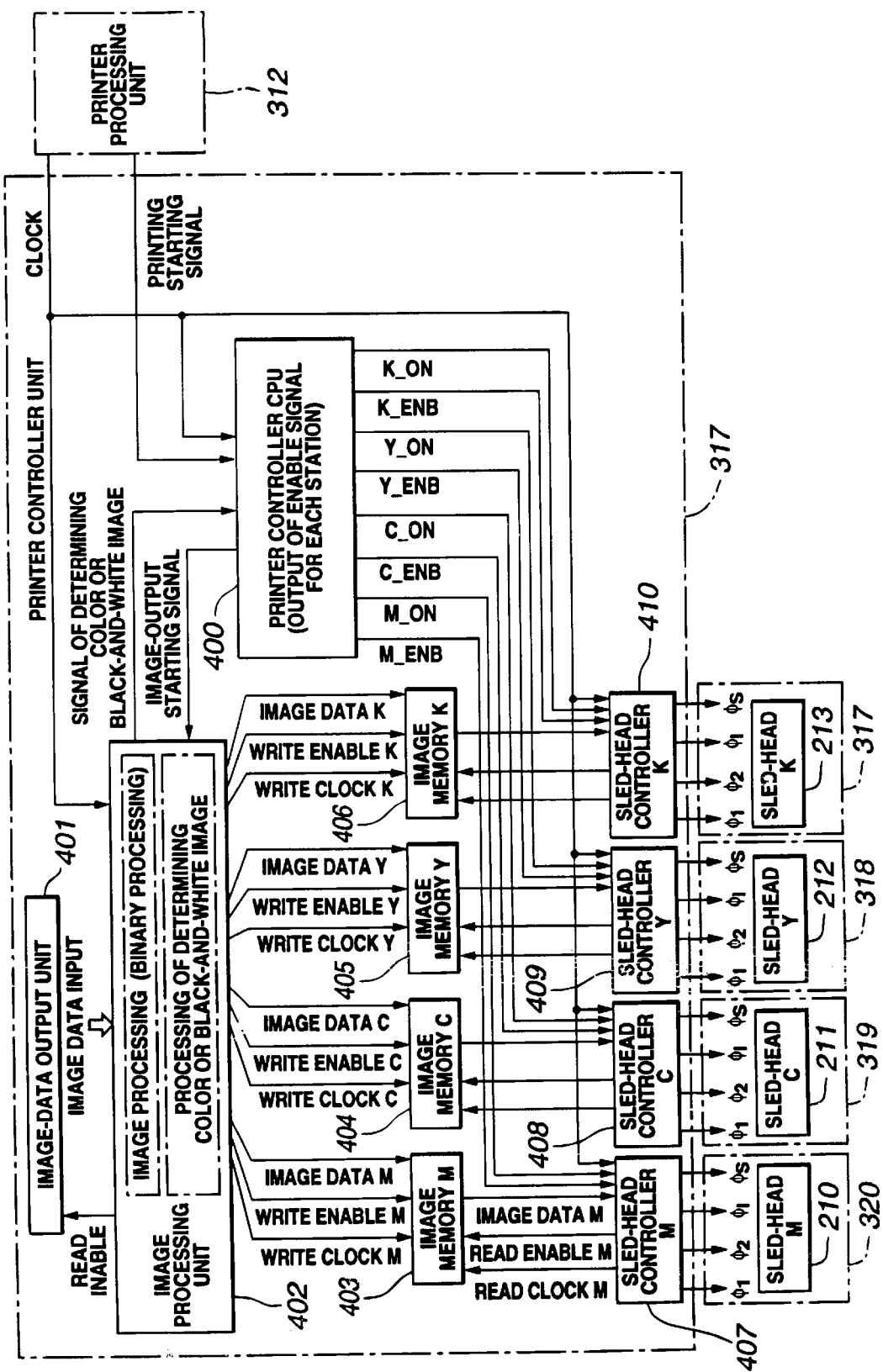
FIG. 2 is a block diagram illustrating the configuration of an exposure control circuit using SLED heads in a color image forming apparatus according to the embodiment.
Figure 4:
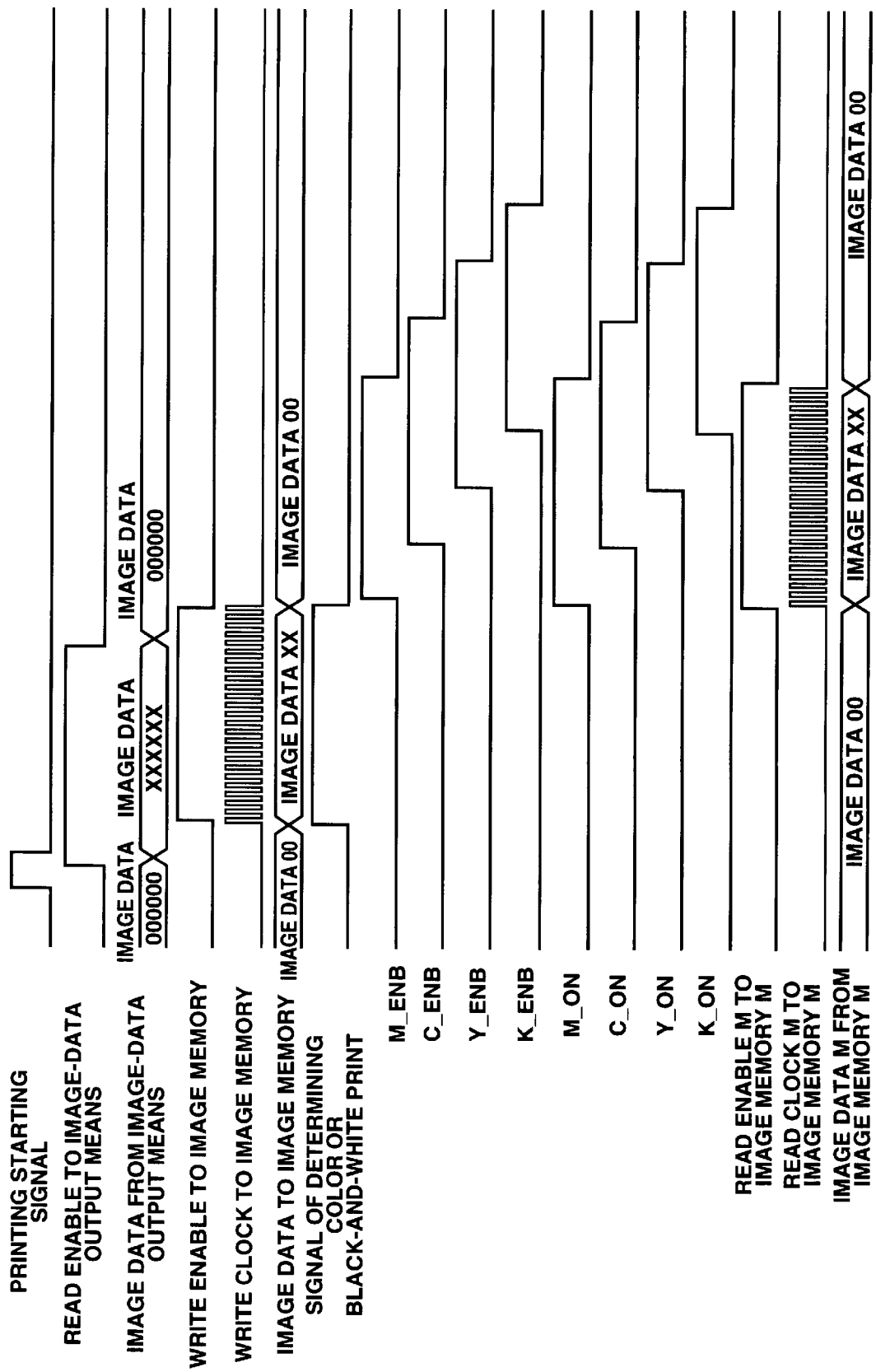
FIG. 4 is a timing chart illustrating respective waveforms when outputting a color image in the exposure control circuit shown in FIG. 2.

FIG. 2 illustrates an exposure control circuit using the SLED heads 210–213 of the apparatus. FIG. 1 illustrates the circuit configuration of a SLED-head controller 407 shown in FIG. 2. FIG. 4 illustrates timing waveforms in the exposure control circuit shown in FIG. 2 when outputting a color image.

In FIG. 1, the SLED-head controller 407 includes a driving-signal generation circuit 407a and logic circuits 407b–407d. A head-exposure enable signal (M_ON) is input to the logic circuits 407b–407d. In this case, the head exposure enable signal is input as an AND condition for the logic circuits.

The logic circuit 407b outputs a Φ1 signal to the SLED head 210. The logic circuit 407c outputs a read clock signal to an image memory 403 (M). The logic circuit 407*d* outputs a read enable signal to the image memory 403.

Although in FIG. 1, the SLED-head controller 407 for M is shown, the same configuration is adopted for the SLED heads 211, 212 and 213 for C, Y and K, respectively.

A description will now be provided of exposure control.

In FIG. 2, upon reception of a printing starting signal, a printer controller CPU 400 for controlling the entire printer generates an image-output starting signal to an image processing unit 402. Upon reception of the image output starting signal, the image processing unit 402 transmits a read enable signal for acquiring image data to an image-data output unit 401. Thus, the image processing unit 402 reads image data from the image-data output unit 401.

The image processing unit 402 first determines whether the transmitted image data represents a color original or a black-and-white original, and transmits the result of the determination to the printer controller CPU 400. At the same time, the image processing unit 402 performs color correction, color conversion (conversion of R, G and B images into Y, M, C and K images), and binary-coding processing. Upon completion of image processing, the image processing unit 402 transmits image data to image memories 403, 404, 405 and 406 provided for the respective stations (i.e., the image forming units 317–320), together with respective write clock signals and write enable signals for writing the image data into the image memories 403, 404, 405 and 406, and writes the image data into the image memories 403, 404, 405 and 406.

Then, the printer controller CPU 400 outputs enable signals M_ENB, C_ENB, Y_ENB and K_ENB for the respective stations corresponding to the printing speed in the order of M, C, Y and K. The printer controller CPU 400 also outputs head-exposure enable signals M_ON, C_ON, Y_ON and K_ON for the SLED heads 210, 211, 212 and 213 of the respective stations at the same timing as the above-described enable signals M_ENB, C_ENB, Y_ENB and K_ENB, respectively.

The above-described enable signals M_ENB, C_ENB, Y_ENB and K_ENB always corresponding to the exposure timings of the four stations are output during a printing operation, whether the image is a color image or a black-and-white image.

The head-exposure enable signals for the SLED heads 210–213 differ from an enable signal for each station. The printer controller CPU 400 receives a signal of determining a color or black-and-white print as a result of determination of a color or black-and-white original by the image processing unit 402, and outputs the respective headexposure enable signals to SLED-head controllers 407, 408, 409 and 410 so that only the station necessary for exposure performs exposure.

Figure 5:
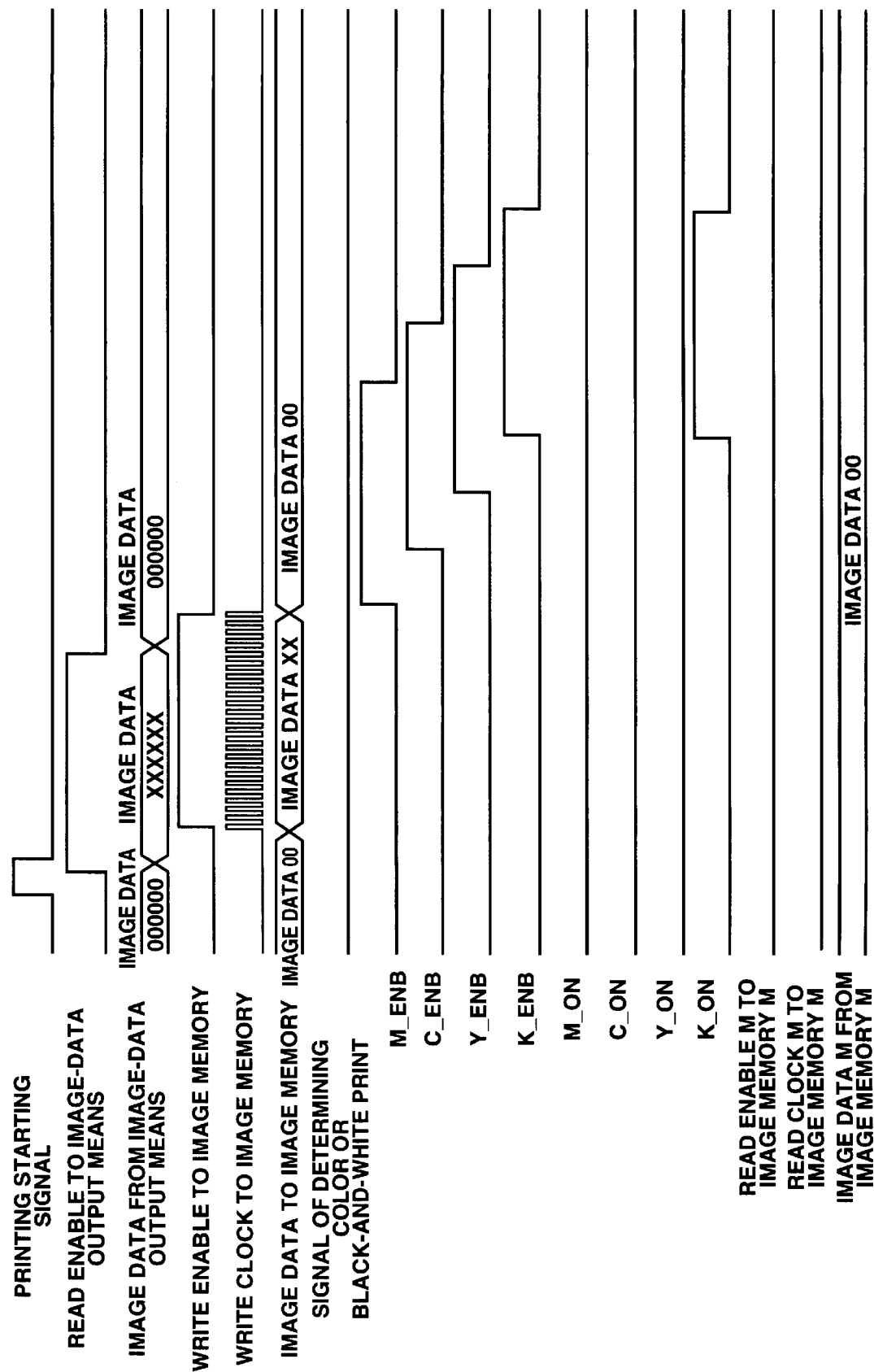
FIG. 5 is a timing chart illustrating respective waveforms when outputting a black-and-white image in the exposure control circuit when an original is determined to be a black-and-white original by an image processing unit shown in FIG. 2.
Figure 6:
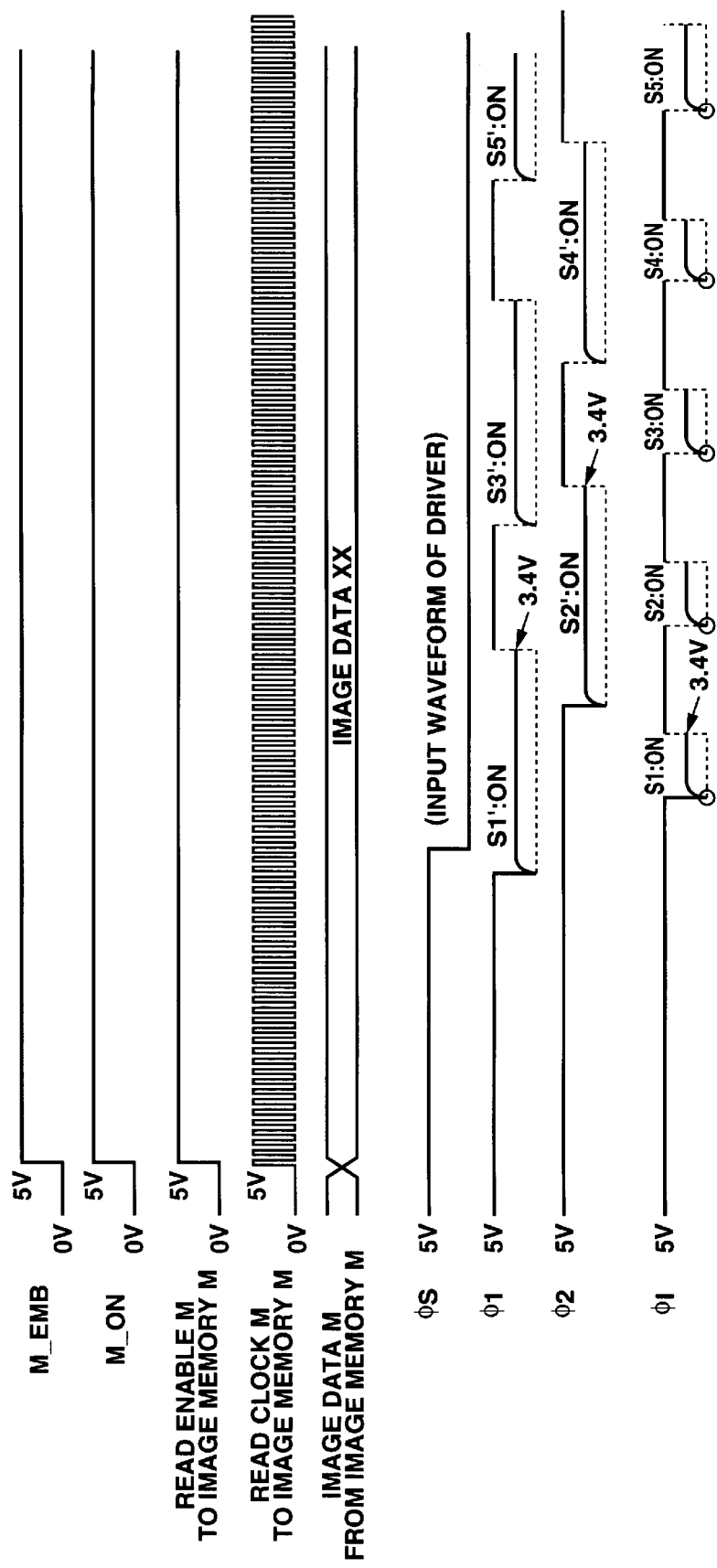
FIG. 6 is a timing chart illustrating respective waveforms in a magenta (M) station when outputting a color original, in the SLED-head controller shown in FIG. 1.
Figure 7:
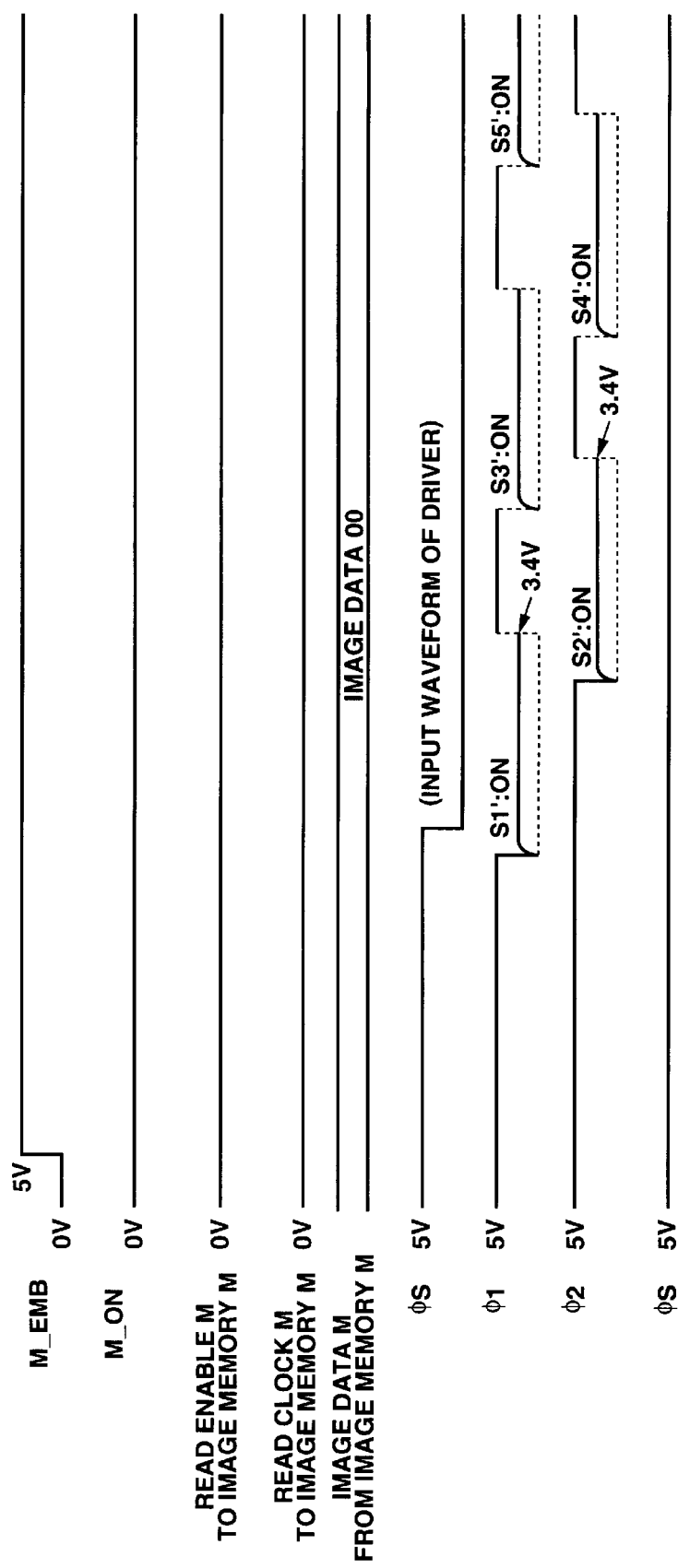
FIG. 7 is a timing chart illustrating respective waveforms in the magenta (M) station when outputting a black-and-white original, in the SLED-head controller shown in FIG. 1.

FIG. 5 illustrates timing waveforms while the exposure control circuit outputs a black-and-white image, when the image processing unit 402 has determined that the image represents a black-white original. FIG. 6 illustrates timing waveforms in the magenta (M) station while the SLED head controller 407 outputs a signal representing a color original. FIG. 7 illustrates timing waveforms in the magenta (M) station while the SLED head controller 407 outputs a signal representing a black-and-white original.

Upon reception of the enable signal for each station from the printer controller CPU 400, a driving-signal generation circuit 407*a* within the SLED-head controller 407 starts driving and outputs a signal necessary for driving the SLED head 210.

The driving-signal generation circuit 407*a* outputs a read clock signal and a read enable signal for receiving image data from the image memory 403, and receives image data from the image memory 403. The driving-signal generation circuit 407*a* also generates signals $\Phi S$, $\Phi 1$, $\Phi 2$ and $\Phi 1$ necessary for driving the SLED head 210.

As shown in the timing waveforms in FIGS. 6 and 7, since the head-exposure enable signal M_ON for the SLED head 210 for an M color image assumes LOW (at that time, the head-exposure enable signals for the SLED heads 211 and 212 for C and Y color images, respectively, also assume LOW) while a black-and-white image is output, a read clock signal and a read enable signal are not output from the logic circuits 407*c* and 407*d* shown in FIG. 1. As a result, image data is not read from the image memory 403. Since the logic circuit 407*b* is a negative logic circuit, the $\Phi 1$ signal output to the SLED heads 210–212 assumes HIGH even if the head-exposure enable signal assumes LOW, so that the light-emitting thyristors of the SLED heads 210–212 are not lit.

However, since other driving signals $\Phi S$, $\Phi 1$ and $\Phi 2$ continue to be output, the transfer thyristors are driven in the SLED heads 210–212.

As described above, by controlling driving so that the transfer operations of transfer thyristors connected to light-emitting thyristors which are not to be lit for SLED heads 210–212 for color images are performed while a black-and-white image is output, it is possible to make the temperatures of the unlit SLED heads 210–212 close to the temperature of the lit SLED head 213 for the black-and-white image, thereby preventing temperature differences among the heads. It is thereby possible to prevent differences among the amounts of light, as well as to always form a sharp image having excellent color balance.

Although in the above-described embodiment, a SLED chip having a scanning function within a light-emitting array chip has been illustrated, the present invention may also be applied to a configuration in which the scanning function is provided outside a light-emitting array chip.

Although a description has been provided illustrating light-emitting elements as the recording elements, the present invention may also be applied to a case of using thermal elements or the like instead of the light-emitting elements.

The scanning function is not limited to the electrical scanning function. The present invention may also be applied to a mechanical scanning mechanism.

The present invention may be applied to a system comprising a plurality of apparatuses (such as a host computer, an interface apparatus, a reader, a printer and the like), or to an apparatus comprising a single unit (such as a copier, a facsimile apparatus or the like)

The present invention may, of course, be applied to case in which the objects of the present invention are achieved by supplying a system or an apparatus with a program. The effects of the present invention may also be provided by supplying a system or an apparatus with a storage medium storing a program represented by software for achieving the objects of the present invention, and reading and executing program codes of the program stored in the storage medium by means of a computer (or a CPU or an MPU (microprocessor unit)) of the system or the apparatus.

In such a case, the program codes themselves read from the storage medium realize the functions of the above-described embodiment, so that the storage medium storing the program codes constitutes the present invention.

For example, a floppy disk, a hard disk, an optical disk, a magnetooptical disk, a CD(compact disc)-ROM(read-only memory), a CD-R (recordable), a magnetic tape, a non-volatile memory card, a ROM (a mask ROM, a flash EEP(electrically erasable and programmable)ROM or the like may be used as the storage medium for supplying the program codes.

The present invention may, of course, be applied not only to a case in which the functions of the above-described embodiment are realized by executing program codes read by a computer, but also to a case in which an OS (operating system) or the like operating in a computer executes a part or the entirety of actual processing, and the functions of the above-described embodiment are realized by the processing.

The present invention may, of course, be applied to a case in which, after writing program codes read from a storage medium into a memory provided in a function expanding board inserted into a computer or in a function expanding unit connected to the computer, a CPU or the like provided in the function expanding board or the function expanding unit performs a part or the entirety of actual processing, and the functions of the above-described embodiment are realized by the processing.

According to the above-described embodiment, when forming an image using at least two recording heads in which transfer thyristors and light-emitting thyristors are arranged in the form of an array, driving is controlled so that the transfer operations of the transfer thyristors of recording heads having light-emitting thyristors not to be lit are performed as the transfer thyristors of a recording head having light-emitting thyristors to be lit. Hence, it is possible to prevent temperature differences among recording heads by making the temperatures of the unlit recording heads close to the temperature of the lit recording head, thereby correcting differences in the amount of light among the recording heads, correcting differences in the density among respective image forming units, and forming a sharp image having excellent color balance.

The individual components shown in outline or designated by blocks in the drawings are all well known in the image forming apparatus arts and their specific construction and operation are not critical to the operation or the best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image forming apparatus comprising:

a plurality of image forming units corresponding to different colors, each of said plurality of image forming units comprising a recording-element array in which recording elements are arranged in the form of an array, a transfer-element array for transferring respective operations of the recording elements, and scanning means for activating said recording-element array by controlling transfer elements constituting said transfer-element array;

input means for inputting image data to each of said plurality of image forming units so that active recording elements perform a record operation based on said image data;

selecting means for selecting an image forming unit; and means for operating the scanning means of an image forming unit selected by said selecting means, with inputting image data, to cause the active recording elements to perform a recording operation based on said image data, and operating scanning means of an image forming unit not selected by said selecting means to cause non-active recording elements not to perform a recording operation.

2. An image forming apparatus according to claim 1, wherein said recording-element array and said transfer-element array are included within a recording chip.

3. An image forming apparatus according to claim 1, wherein the recording element comprises a light-emitting element.

4. An image forming apparatus according to claim 3, wherein the transfer element comprises a transfer thyristor, wherein the light-emitting element comprises a light-emitting thyristor, and wherein the gate of the transfer thyristor and the gate of the light-emitting thyristor are connected to each other.

5. An image forming apparatus according to claim 3, wherein each of said plurality of image forming units comprises:

a photosensitive member;

developing means for developing a latent image on said photosensitive member; and transfer means for transferring a toner image on said photosensitive member onto a common recording medium in a superposed state.

6. An image forming apparatus according to claim 1, wherein said plurality of image forming units comprise a black-image forming unit for forming a black image, a yellow-image forming unit for forming a yellow image, a magenta-image forming unit for forming a magenta image, and a cyan-image forming unit for forming a cyan image.

7. An image forming apparatus according to claim 6, wherein said image forming apparatus discharges a sheet onto which a black image formed by said black-image forming unit has been transferred, in a black-image forming mode, and discharges a sheet on which a black image formed by said black-image forming unit, a yellow image formed by said yellow-image forming unit, a magenta image formed by said magenta-image forming unit, and a cyan image formed by said cyan-image forming unit have been superposed on the same recording sheet to provide a color image in a color-image forming mode.

8. An image forming apparatus according to claim 7, wherein said operating means also operates said scanning means of said black-image forming unit in the black-image forming mode.

9. A method for controlling an image forming apparatus having a plurality of image forming units corresponding to different colors, each of the plurality of image forming units comprising a recording-element array in which recording elements are arranged in the form of an array, a transfer-element array for transferring respective operations of the recording elements, and scanning means for actuating said recording-element array by controlling transfer elements constituting said transfer-element array, the method comprising the steps of:

inputting image data to each of said plurality of image forming units so that active recording elements perform a record operation based on said input image data;

selecting an image forming unit; and operating a scanning of an image forming unit selected in said selecting step, with inputting image data, to cause the active recording element to perform a recording operation based on said image data and operating an image forming unit, not selected by said selecting step, to cause a non-active recording element not to perform a recording operation.

* * * * *

UNITED STATES PATENT AND TRADEMARK OFFICE
CERTIFICATE OF CORRECTION

PATENT NO. : 6,323,887 B1
DATED : November 27, 2001
INVENTOR(S) : Mitsuo Shiraishi et al.

It is certified that error appears in the above-identified patent and that said Letters Patent is hereby corrected as shown below:

Title page,
Item [57], ABSTRACT,
Line 9, "thrystors" should read -- thyristors --.

Drawings,
Sheet 2, FIG. 2, "INABLE" should read -- ENABLE --.

Column 2,
Line 33, "digram" should read -- diagram --.

Column 3,
Line 67, "unit.)" should read -- unit) --.

Column 6,
Line 17, "thyristsor" should read -- thyristor --; and
Line 22, "thrystor" should read -- thyristor --.

Column 7,
Line 49, "headexposure" should read -- head-exposure --.

Column 9,
Line 2, "magnetooptical" should read -- magneto-optical --.

Signed and Sealed this

Tenth Day of December, 2002

JAMES E. ROGAN
*Director of the United States Patent and Trademark Office*